Sept. 21, 1943. C. L. STOEN 2,330,156
TOOL HOLDER FOR MACHINE TOOL TURRETS
Filed Oct. 1, 1941
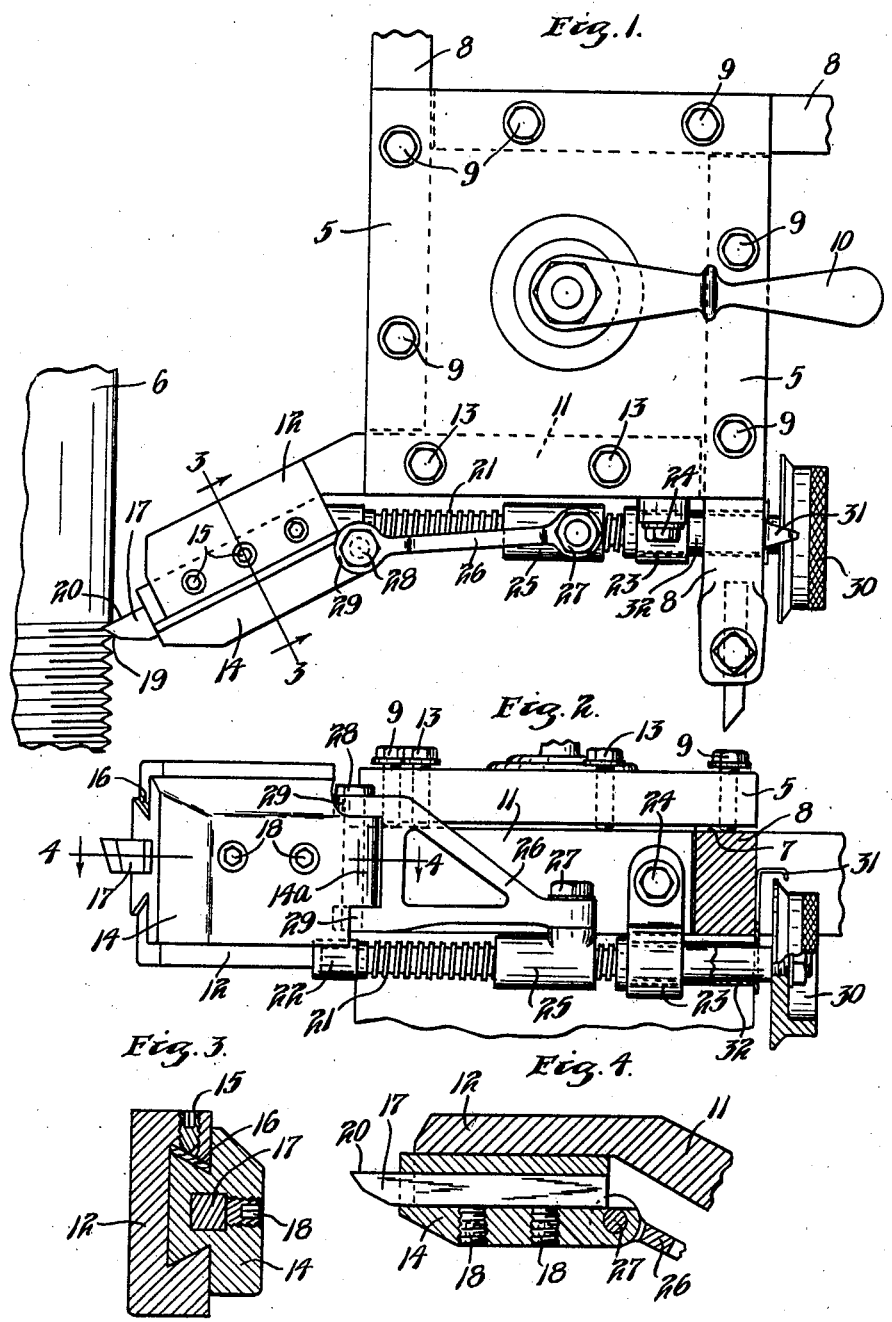
INVENTOR.
CLIFFORD L. STOEN.
BY HIS ATTORNEYS.
Williamson & Williamson Patented Sept. 21, 1943

2,330,156

UNITED STATES PATENT OFFICE 2,330,156

TOOLHOLDER FOR MACHINE TOOL TURRETS

Clifford L. Stoen, West St. Paul, Minn., assignor to The Warner & Swasey Company, Cleveland, Ohio, a corporation of Ohio Application October 1, 1941, Serial No. 413,131

10 Claims. (Cl. 10—101)

This invention relates to tool holders for turrets of machine tools.

In mounting on a face of a machine tool turret a tool holder which is provided with means for feeding a cutting tool it has been found that such feeding means often interferes with or prevents the mounting of a cutting tool on the next adjacent face of the turret.

The principal object of the present invention is to provide a tool holder that has means for feeding a cutting tool carried by the holder and which tool holder is so constructed and can be so mounted on a face of a machine tool turret that the feeding means of the tool holder and the other cutting tools or tool holders mounted on the adjacent faces of the turret do not conflict with each other, whereby every face of the turret may carry a cutting tool or tool holder capable of functioning in the desired manner and also allowing for operation of the feeding means of said first tool holder.

A more specific object of the invention is to provide a thread cutting tool holder that has mechanism for feeding the tool and which tool holder is so constructed and can be so mounted on a face of a machine tool turret that every other face of the turret may be equipped with a tool or tool holder without interfering with said feeding mechanism of the thread cutting tool holder.

Another object of the invention is to provide a tool holder having a cutting tool holding slide and mechanism for imparting feeding movements to said slide and which tool holder, slide and mechanism are so constructed and interrelated that said mechanism lies closely adjacent to the shank or body of the tool holder.

Further and additional objects and advantages not hereinbefore referred to will become apparent hereinafter during the following detailed description of an embodiment of the invention which is illustrated in the accompanying drawing wherein, Fig. 1 is a plan view of a square turret of a machine tool and shows a portion of a work piece being machined by a cutting tool carried by a tool holder embodying the invention and mounted on one face of the turret, while another tool holder carrying a cutting tool is mounted on the adjacent turret face and in addition portions of similar tool holders are shown mounted on the remaining turret faces.

Fig. 2 is a side elevational view of the upper portion of the turret showing the tool holder mounted on the face of the turret, while the tool holder that is mounted on the adjacent face of the turret is shown in section.

Fig. 3 is a sectional view taken on line 3—3 of Fig. 1, and

Fig. 4 is a sectional view taken on line 4—4 of Fig. 2.

The drawing illustrates, by way of example, a square turret 5 which, as is well understood in the art, is indexible and is carried by the cross slide of a carriage slidable on the machine tool bed, wherefore cutting tools on the turret can be brought into and from cutting relationship with respect to the work piece 6 which is rotatably carried by the work spindle, and can also be fed along the work piece.

The turret 5 is provided on its vertical faces with horizontal grooves 7 in which may be mounted tools or tool holders 8 of conventional construction. The tool or tool holders 8 are clamped in position by means of setscrews 9 and, as shown, each of the tools or tool holders 8 extends outwardly from a face of the turret with each tool or tool holder extending past the inner end of an adjacent tool or tool holder (see Fig. 1). As is well understood in the art the turret 5 can be rotated or indexed to bring any one of its faces and the tool or tool holder mounted thereon into operative position with respect to the work piece, and said turret can be clamped in indexed position by mechanism not shown but which is operated by the handle 10.

The tool holder embodying the invention includes a straight shank or bar 11 at one end of which is an extension 12 which, in this instance, is arranged obliquely relative to the shank or bar, it being understood, however, that said extension might be positioned at a different angle with respect to the shank or it might extend straight from the shank. The straight shank 11 of the tool holder is mounted in a groove 7 on one face of the turret and clamped in place by setscrews 13 similar to the setscrews 9 which clamp the tools or tool holders 8 in position. When the shank 11 is so clamped in position in the groove 7 on the face of the turret the extension 12 projects outwardly from the face of the turret as clearly shown in Figs. 1 and 2. The extension or oblique bar portion 12 is provided with a guideway for a movably mounted tool support, block or slide 14. As illustrated in Fig. 3, the guideway on the extension or oblique bar portion 12 may be in the form of a dovetail groove having a gib 16 which can be engaged with one side of a tenon on the slide or block 14 and which tenon slidably interfits the dovetail groove. The gib 16 is adjusted by means of setscrews 15, wherefore the tenon on the slide or block 14 may slide in the groove in the extension 12 or can be clamped in adjusted position therein. A cutting tool 17 is carried by the slide or block 14 and in this instance is shown as mounted in a square opening formed in the block and retained in said opening by means of setscrews 18 as shown in Figs. 3 and 4. The tool 17 is shown as having the usual cutting edge 19 and the usual edge 20 parallel to the direction of movement of the block or slide 14.

It will be understood that movement is imparted to the tool support, slide or block 14 to adjust or feed the cutting tool 17 relative to the work piece and various mechanisms may be employed within the compass of the present invention for imparting this movement to the support, slide or block 14. As illustrative of one form of such mechanisms a threaded shaft or screw 21 is provided and said shaft has a reduced bearing end portion which rotatably interfits a bearing 22 carried by the shank adjacent the extension or oblique bar portion 12. The shaft or screw 21 is rotatably supported by a bearing bracket 23 and has at the right hand end of the threaded portion a shoulder which bears against said bearing bracket. The bearing bracket 23 is secured to the bar or shank 11 by a bolt 24. The shaft or screw 21 extends a substantial distance to the right beyond the bracket 23 and beyond the adjacent face of the turret 5 in a manner later to be referred to.

A follower or nut 25 is mounted on the threaded portion of the shaft or screw 21 intermediate the bearings 22 and 23. A link 26 has one of its ends pivotally connected to the nut or follower 25, as indicated at 27, while the opposite end of said link is forked and embraces a rearward extension 14a of the tool block or slide 14. A pivot or bearing pin 28 extends through the arms 29 of the forked end of the link 26 and through the rearward extension 14a of the tool block or slide 14.

It will thus be seen that when the screw or shaft 21 is rotated the follower or nut 25 will move linearly to the right or to the left and through the link 26 will cause the tool block or slide to move linearly of the guideway of the extension 12.

The right hand end of the screw or shaft 21 has secured thereto a knob 30 in the form of a graduated dial with the graduations thereof, which may be in the form of indicia, cooperating with a pointer 31 carried by a sleeve 32 secured to the bracket 23. The pointer 31 and the knob 30, therefore, visibly indicate the adjustment which has been imparted to the tool 17 and the tool support, block or slide 14.

It will be noted that the shaft or screw 21 is located at the side of and below the shank or bar 11 and parallel thereto, see Fig. 2, and further that the bracket 23 and the knob 30 and pointer 31 are spaced apart sufficiently far to enable a tool or tool holder on the adjacent face of the turret to pass therebetween and above the shaft 21 as clearly shown in Fig. 2. Therefore the tool holder embodying the present invention can be applied as a unitary structure to or removed from the face of the turret or adjusted thereon without interfering in any way with the tool or tool holder on the adjacent face of the turret. Conversely, the tool or tool holder on said adjacent face of the turret can be removed from or applied to or adjusted on the adjacent face of the turret without interfering in any way with the tool holder of the present invention when the latter is mounted on the turret.

Although a preferred embodiment of the invention has been illustrated and described herein it will be understood that the invention is susceptible of various modifications and adaptations within the scope of the appended claims.

What is claimed is:

1. A tool holder for lathe turrets comprising, a straight bar portion, an oblique extension having an undercut groove therein, a tool holding block having a portion thereof dovetailed into said undercut groove and slidable therein, a tool releasably fitted in said block, a screw extending closely adjacent and longitudinally of said straight bar, a follower threaded upon said screw, and a connection between said follower and said tool holding block to permit sliding movement of said block relative to said oblique bar extension upon rotation of said screw.

2. A tool holder for lathe turrets comprising, a relatively straight bar member having an oblique portion at one end thereof, said oblique portion having an undercut groove therein, a tool holding block having a portion dovetailed into said undercut groove and slidable therein, means for securing said block against sliding movement relative to said oblique bar portion, a screw supported by said bar and rotatable relative thereto, a follower on said screw, and a connection between said follower and said tool holding block to permit movement of said block upon rotation of said screw when said block securing means is released.

3. A tool holder for lathe turrets comprising, a bar including a relatively straight portion and an oblique portion, a tool holding block slidably supported by said oblique bar portion, a screw supported by said bar adjacent the lower side thereof, a follower on said screw, and a link pivotally connecting said follower to said block and lying substantially parallel to and closely adjacent said screw.

4. A tool holder for machine tool turrets comprising a shank portion adapted to be secured to a turret face and having at one end an extension, a tool support carried by said extension and movable thereon, actuating means located at the side and below said shank and supported thereby, and means operatively interconnecting said support and said actuating means.

5. A tool holder for machine tool turrets comprising a shank portion adapted to be secured to a turret face and having at one end an extension, a tool support carried by said extension and movable thereon, actuating means located at the side and below said shank and parallel thereto and supported thereby, and means operatively interconnecting said support and said actuating means.

6. A tool holder for machine tool turrets comprising a shank portion adapted to be secured to a turret face and having at one end an extension, a tool support carried by said extension and movable thereon, actuating means supported by said shank and located at the side and below the same and having a portion extending beyond the inner end thereof and provided with an operating element, and means operatively interconnecting said support and said actuating means.

7. A tool holder for machine tool turrets comprising a shank portion adapted to be secured to a turret face and having at one end an extension, a tool support carried by said extension and movable thereon, actuating means carried by said shank and located at the side and below the same and parallel thereto and having a portion extending beyond the other end of the shank and provided with an operating element, and means operatively interconnecting said support and said actuating means.

8. A tool holder for machine tool turrets comprising a shank portion adapted to be secured to a turret face and having at one end an extension provided with a guideway, a tool support slidable in said guideway, actuating means located at the side and below said shank and supported thereby, and means operatively interconnecting said support and said actuating means.

9. A tool holder for machine tool turrets comprising a shank portion adapted to be secured to a turret face and having at one end an extension and provided with bearings spaced longitudinally thereof, a tool support carried by said extension and movable thereon, rotatable actuating means mounted in said bearings at the side and below said shank and parallel thereto, and means operatively interconnecting said support and said actuating means such that rotation of the latter imparts movement to said support.

10. A tool holder for machine tool turrets comprising a shank portion adapted to be secured to a turret face and having at one end an extension and provided with bearings located at the side and below said shank with one of said bearings adjacent the other end of the shank portion and the other of said bearings adjacent said extension, a tool support carried by said extension and movable thereon, an actuating shaft mounted in said bearings and having a portion extending a substantial distance beyond said other end of said shank portion and provided with an operating element, and means operatively connected to said tool support and to said shaft intermediate said bearings for transmitting movement of said shaft to said support.

CLIFFORD L. STOEN.